T. FULLBRIGHT.
WIRE MILL.
APPLICATION FILED OCT. 16, 1918.

1,350,307.

Patented Aug. 24, 1920.
4 SHEETS—SHEET 1.

Inventor
Thomas Fullbright.
By Victor J. Evans
Attorney

Inventor
Thomas Fullbright.
By Victor J. Evans
Attorney

T. FULLBRIGHT.
WIRE MILL.
APPLICATION FILED OCT. 16, 1918.

1,350,307.

Patented Aug. 24, 1920.
4 SHEETS—SHEET 3.

Inventor
Thomas Fullbright.
By Victor J. Evans
Attorney

T. FULLBRIGHT.
WIRE MILL.
APPLICATION FILED OCT. 16, 1918.

1,350,307.

Patented Aug. 24, 1920.
4 SHEETS—SHEET 4.

Inventor
Thomas Fullbright.
By Victor J. Evans
Attorney

UNITED STATES PATENT OFFICE.

THOMAS FULLBRIGHT, OF ST. LOUIS, MISSOURI.

WIRE-MILL.

1,350,307.  Specification of Letters Patent.  Patented Aug. 24, 1920.

Application filed October 16, 1918. Serial No. 258,349.

*To all whom it may concern:*

Be it known that I, THOMAS FULLBRIGHT, a citizen of the United States, residing at St. Louis, and State of Missouri, have invented new and useful Improvements in Wire-Mills, of which the following is a specification.

This invention has reference to a wire mill.

The object of the invention is to provide means whereby twisted wire, or like metal, either in determined lengths or in scraps may be passed between a series of rolls operating in opposite directions, will, by contacting engagement with said rolls be delivered in a straightened condition.

A further object of the invention is to produce a mill of this character comprising comparatively few parts which are not liable to breakage or disalinement, and which will perform the functions for which it is adapted in an expeditious and thoroughly effective manner.

Figure 1:
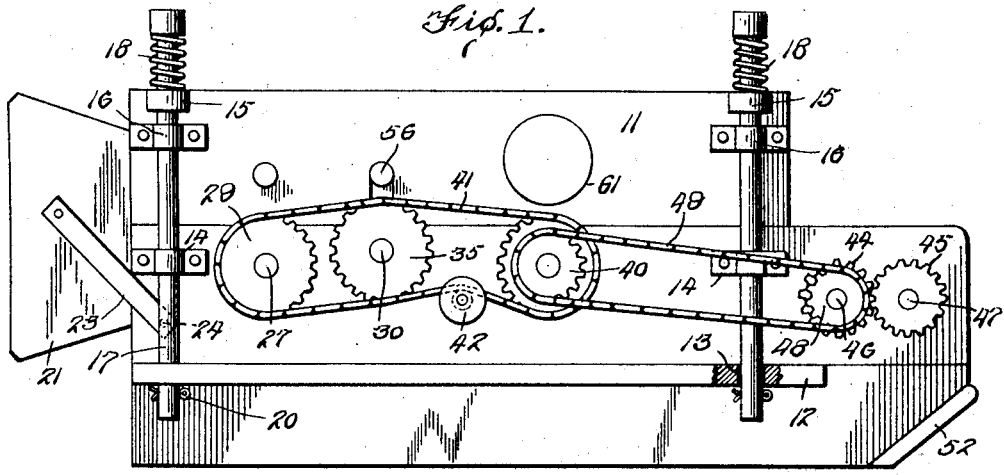
Figure 1 is a side elevation of the improvement.
Figure 2:
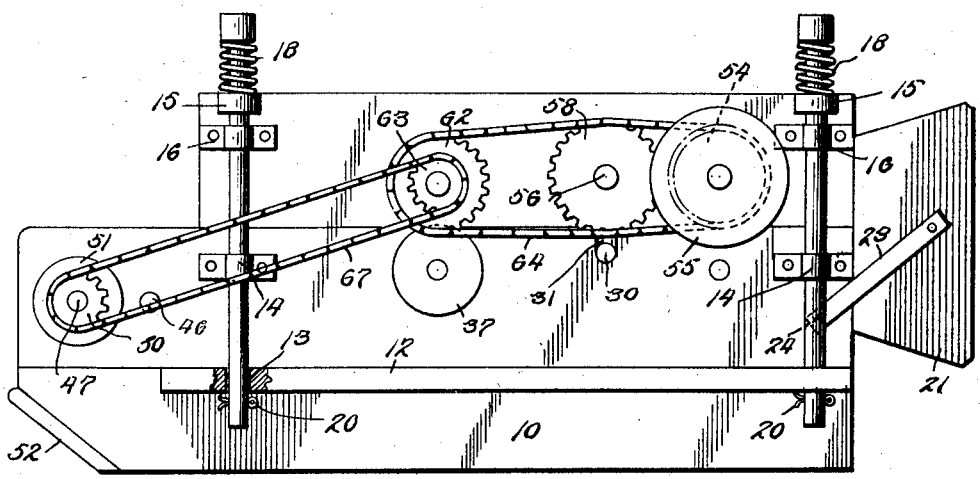
Fig. 2 is a similar view but looking toward the opposite side thereof.
Figure 3:
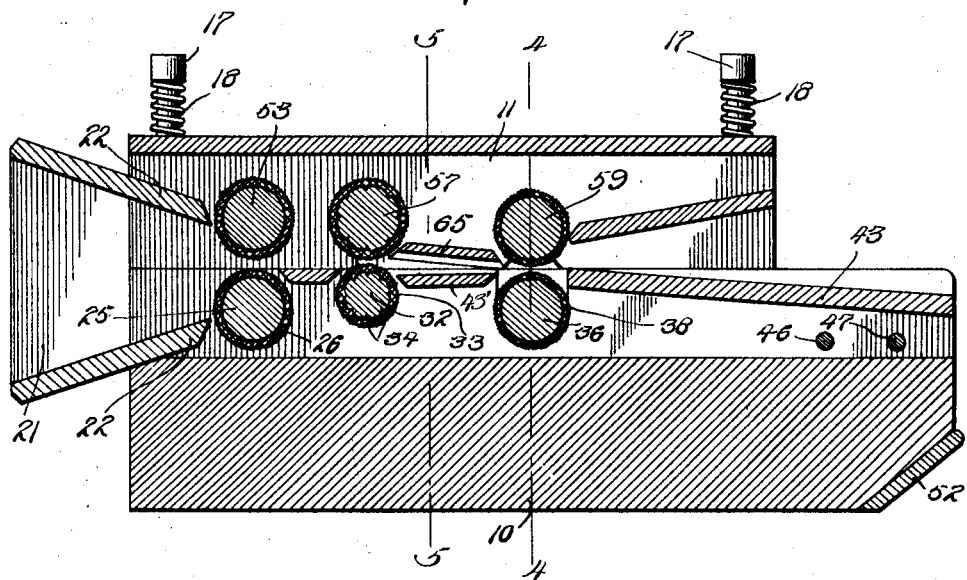
Fig. 3 is an approximately central longitudinal sectional view through the same.
Figure 8:
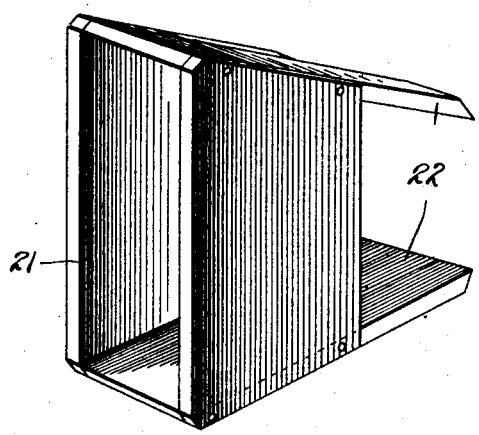
Fig. 8 is a perspective view of the hopper.
Figure 4:
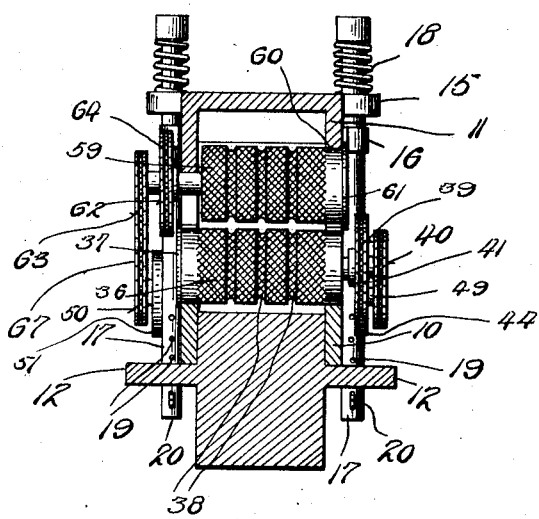
Fig. 4 is a transverse sectional view approximately on the line 4—4 of Fig. 1.
Figure 5:
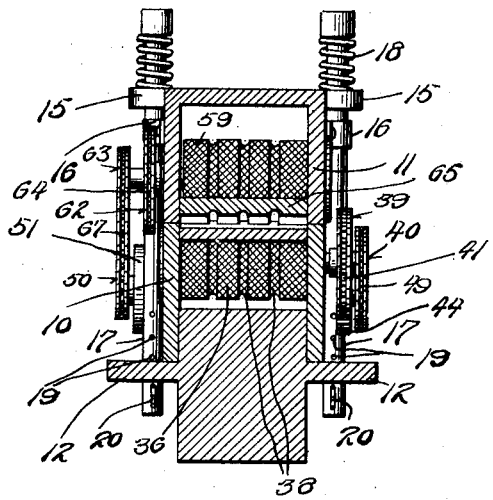
Fig. 5 is a similar view approximately on the line 5—5 of Fig. 2.
Figure 6:
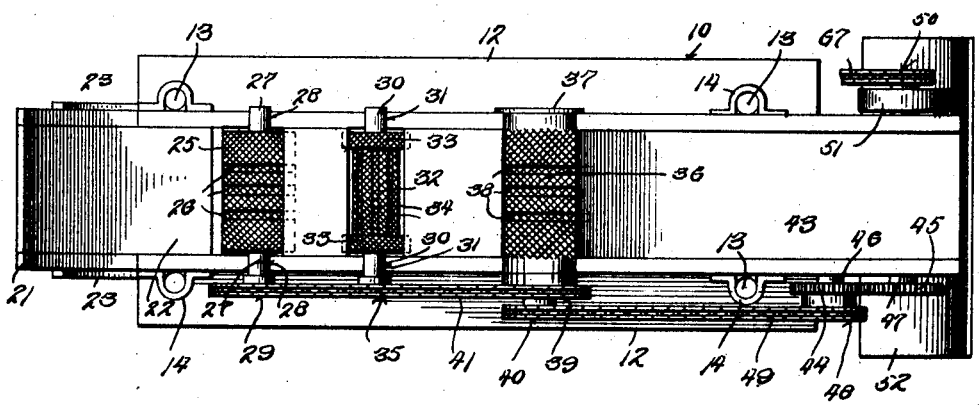
Fig. 6 is a plan view of the lower section of the mill.
Figure 7:
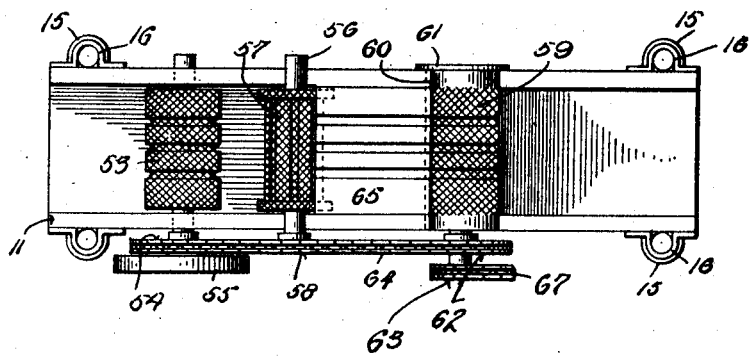
Fig. 7 is a bottom plan view of the upper section of the mill.

The mill includes a body or frame constituting two superimposed sections, the lower section being indicated by the numeral 10 and the upper section by the numeral 11. The lower section 10, at a suitable distance above the bottom thereof is provided with longitudinally arranged outstanding ledges 12, having suitable spaced openings 13 therethrough. The sides of the said section 10, in a line with the openings 13 are provided with guide brackets 14.

The upper section 11, at the top thereof is provided with laterally extending ears 15 and with guide brackets 16 alining with openings in the said ears. When the sections are assembled the openings in the guide brackets, ears and ledges aline, and passing through these alining openings are the shanks of headed rods 17. A spring 18 is arranged on each of the rods, and being of spiral formation exerts a tension between the heads of the said rods and the ears 15 in the upper section 11. The lower ends of the rods pass through the openings 13 in the ledges 12, of the lower section, and these portions of the rods are provided with a spaced series of transverse apertures 19 which receive therethrough retaining elements preferably in the nature of cotter pins 20. By this arrangement it will be seen that the sections comprising the mill, while retained in longitudinal alinement permit of an outward movement of the upper section 11 from the lower section 10, when material of different sizes is passed through the mill, as will hereinafter be more fully set forth.

At the front end of the lower section 10 is arranged a mouth or hopper 21, the same having its upper and lower walls inclined downwardly and inwardly, the said walls, for distinction being indicated by the numerals 22. The hopper 21 is connected to the sides of the section 10 by straps 23 which are pivotally secured to the said hopper and to the sides of the section 10 as indicated by the numerals 24 respectively. The hopper has its walls 22 of a greater length than the side walls thereof, and the side walls normally contact with the end of both of the sections of the mill. The straps, being pivoted and being arranged angularly between the hopper and the lower section 10, however, permit of the hopper being arranged at a suitable angle with respect to the mill, whereby material may be properly delivered therein, it being noted that the upper and lower walls 22 of the hopper have their extending portions of a less width than the hopper proper.

The lower section, directly inward of the hopper has journaled therein a transversely arranged roll 25 having a plurality of spaced annular grooves or depressions 26, which are comparatively deep. The walls of the depressions are serrated or otherwise roughened, as may be the periphery of the roll. The trunnions 27 for the roll 25 are received in suitable notches 28 in the sides of the section 10, which form the bearings for the said trunnions. One of these trunnions projects a suitable distance beyond one of the sides of the section 10 and has keyed or otherwise secured thereon a sprocket wheel 29.

Inward of the roll 25, and having its trunnions 30 received in bearing notches 31 in the sides of the section 10, is a second and intermediate roll 32. This roll is preferably provided with flanges adjacent its ends which are indicated by the numeral 33 and is provided with longitudinal peripheral depressions 34, the walls formed thereby being roughened or serrated as may be the periphery of the said roll. On one of the trunnions 30 is secured a sprocket wheel 35 disposed opposite the sprocket wheel 29.

The depressions 34 in the roll 32 are of a slightly less depth than the depressions in the roll 25.

The third roll, for the section 10 is indicated by the numeral 36, and the sides of the section 10 have bearing depressions for the roll. The roll has its ends formed with flanges 37 which contact with the outer faces or sides of the section 10. This roll 36 is provided with spaced circumferential depressions 38 which are of a depth less than those in the roll 33, and consequently of a materially less depth than the depressions in the roll 25. On one end of the roll 36 is secured a sprocket wheel 39, and outward of the said sprocket is a chain or sprocket wheel 40.

Trained around the sprocket wheels 39, 35 and 29 is an endless chain 41, the said chain being also guided over a grooved wheel or roll 42 which may be adjustably connected to the section 10, and whereby the tension of the chain 41 may be regulated.

By reference to the drawings it will be seen that the top or floor of the bottom or lower section 10 is cut away transversely to receive all of the rollers, and it will be also noted that the lower inclined wall of the hopper is received between the sides of the said section 10 to direct the material to the first roll 25. The top or floor of the section 10, to the rear of the innermost roll 36 is arranged downwardly at an inclination and is, for distinction indicated by the numeral 43. This permits of a free delivery at the outlet end of the mill. The intermediate portion of the top of the section 10, or that portion between the rolls 32 and 36, indicated for distinction by the numeral 43' is disposed at an angle and is positioned slightly below the upper edges of the section 10, and slightly below the upper faces of the rolls 32 and 36.

On the side of the section 10 provided with the endless chain and the chain wheels engaged thereby, and adjacent to the outlet end of the mill, are arranged two intermeshing gears 44 and 45 respectively. The shafts 46 and 47 of these gears may pass through journal openings in both of the sides of the section 10, the shaft 47, however, projecting a suitable distance to the opposite side of the said section 10, this shaft carrying the gear 45. On the outer face of the gear 44 is a sprocket wheel 48 around which is trained a sprocket chain 49 that also engages with the chain wheel 40 secured on the outer face of the sprocket 39 of the roll 36. The rotation of the intermeshing gears 44 and 45, it will thus be noted, will impart motion to all of the rolls carried by the lower section 10. On the projecting end of the shaft 47 is secured a sprocket wheel 50 and a pulley 51. The pulley is adapted to receive a belt thereon which is driven by any desired source of power (not shown).

The bottom section has its outlet end, its lower corner arranged at an inclination and provided with a transverse cleat or strip 52 which may be bolted to any desired support and, of course, if desired additional cleats may be provided upon the base and secured to the support, said cleats engaging the ground surface, and being extended beyond the sides of the device, and tend to steady the mill and hold the same against movement during the wire straightening operation.

The upper section 11 may be in the nature of a rectangular frame having its under face open and is of a less length than the lower section. Between the side walls of the said upper section, adjacent to the front end thereof is a roll 53 which rests directly on the roll 25. The roll 53 has peripheral grooves or depressions, corresponding to the grooves and depressions in the roll 25, the walls provided by the depressions being roughened or serrated, and the outer periphery of the said roll being likewise roughened or serrated. The shaft or trunnions for the roll 53 find bearings in openings in the sides of the member 11 and have one of their ends projecting beyond one of the sides of the said member. On this projecting end of the trunnion is keyed or otherwise secured a sprocket wheel 54, while outward of the said sprocket wheel the trunnion is provided with a fly wheel 55.

Having its trunnions 56 received in bearing notches, in the sides of the section 11, is the intermediate roll 57 for the upper section 11. This roll is provided with longitudinal grooves or depressions the walls of which are serrated, and the periphery of the roll between the said grooves may be likewise roughened or serrated. On one of the trunnions for the roll 53 is keyed or otherwise secured a sprocket wheel 58. The third roll carried by the upper section 11 is designated by the numeral 59 and rests directly over the roll 36 of the section 10. This roll 59 is provided with transverse continuous grooves or depressions, the walls of which being serrated or roughened, as may be the periphery of the said roll between the said grooves or depressions. The roll 59 is received in openings 60 in the sides of the section 11, being held against longitudinal movement by flanges 61 thereon. One of the ends of the roll 59 has secured thereon a sprocket wheel 62, and outward of said sprocket wheel, a second sprocket or chain wheel 63. The numeral 64 designates an endless chain which is trained around the sprockets 62, 58 and 54 for the rolls carried by the said upper section. Between the rolls 59 and 57, the upper section 11 is provided with an angularly arranged longitudinal grooved plate 65, and outward of the said roll 59 there is secured between the sides of the said section 11 an upwardly inclined plate 66. The plate 65 is disposed over the floor plate 43', and the plate 66 is disposed over the floor plate 43. The plates of the section 11 are disposed at opposite angles with respect to the angularly arranged floor plates of the section 10. The plates 65 and 43' materially assist in straightening wires passing through the mill. The ends of the plates 65 and 43' opposite the rolls 32 and 57 are spaced a greater distance away from each other than the opposite ends of the said plates which are disposed adjacent to the rolls 36 and 59. Thus the mouth of the passage between the plates 65 and 43' is comparatively wide, while the outlet of the passage is restricted. As a consequence material contacting the confronting faces of the plates will be partially straightened by contacting engagement with the plates before such material is delivered to the final rolls 38 and 59. Congestion of material delivered from the rolls 36 and 59 on to the plate 43 will be prevented by the angular arrangement of the plate 66 with respect to the plate 43. A tendency of the straightened material to bunch will be also prevented as the outlet provided by the space between the said plates is wider at the end of the device than at the inner ends of the said plates, and material contacting with the plate 66 will be properly directed therefrom onto the plate 43. By reference to the drawings it will be noted that the sprockets and driving chain for the rolls of the upper section 11 are arranged upon the opposite side of the mill from those on the lower section of the mill. Trained around the chain wheel 63 and the chain or sprocket wheel 50 is an endless chain 67 which, when the pulley 51 is rotated, imparts motion to the roll 59, and through the medium of the chain 64 to the remaining rolls carried by the upper section 11. It will be noted that the gearing for the rolls of the sections 10 and 11 is such as to cause the same to revolve at the same rate of speed simultaneously in a reverse direction, so that the wire or other metal inserted in the hopper will be first received in the deep grooves of the rolls adjacent to the hopper and will be delivered by the said rolls to the intermediate pair of rolls, and from thence to the innermost pair of rolls, and from these rolls through the outlet end of the machine.

From the foregoing description, when taken in connection with the drawings it is believed that the simplicity of the construction and advantages thereof will be fully understood. The nature of the invention is such that the same is necessarily susceptible to various changes, in size, proportion, etc.; and it is to be understood that I am not to be limited to the precise structural details disclosed by the drawings or set forth in the specification, but am entitled to all such changes as fall within the scope of the appended claims.

Having thus described the invention, what is claimed as new, is:—

1. A mill for straightening wire or the like comprising two superimposed sections, transverse grooved and serrated rolls carried by both of the sections and contacting respectively, a hopper having upper and lower inclined walls at the delivery mouth of the mill, angularly arranged straps pivotally connected to the lower mill section and to the sides of the hopper, and means for simultaneously revolving the rolls of the upper and lower sections at the same rate of speed in an opposite direction, ears on the upper section, ledges on the lower section, brackets on both of the sections, headed rods passing through the respective ears, brackets and ledges, springs between the heads of said bolts and the ears, and means for adjustably securing the bolts to the ledges whereby to hold the sections of the mill associated and to regulate the tension of the springs.

2. A mill for straightening wire and the like comprising two superimposed sections, the lower section being of a greater length than the upper section, said lower section having its sides provided with transverse notches, notched and serrated rolls having trunnions received in said notches, plates between the intermediate and inner end rolls, an inclined plate between the inner end roll and the delivery end of the said section, a hopper secured to the inlet end of the said section, angularly arranged straps pivoted to the lower section of the mill and to the sides of the hopper, the upper section having spaced notches, grooved and serrated rolls having trunnions journaled in said notches, spring influenced means for removably connecting the sections and for holding the rolls of the respective sections in contacting engagement, means upon one of the sides of the mill for imparting a rotary motion to the series of rolls carried by one of the sections and for revolving elements on the opposite side of the mill for imparting motion to the rolls carried by the other section in a reverse direction to that of the first mentioned rolls, and whereby all of said rolls are revolved at the same rate of speed.

In testimony whereof I affix my signature.

THOMAS FULLBRIGHT.